Patented Dec. 29, 1936

2,065,756

UNITED STATES PATENT OFFICE 2,065,756

HYDROGENATED ESTERS

Norman D. Scott, Sanborn, N. Y., assignor to E. I. du Pont de Nemours & Company, Wilmington, Del., a corporation of Delaware No Drawing. Application November 5, 1934, Serial No. 751,581. Renewed May 15, 1936

12 Claims. (Cl. 260—99.40)

This invention relates to new hydrogenated organic products and more particularly to the preparation of substances made by hydrogenating esters of dihydronaphthalene dicarboxylic acids.

In copending application Serial No. 638524, I have described and claimed a method for the production of dihydronaphthalene dicarboxylic acids and other dicarboxyl derivatives of partially hydrogenated aromatic polycyclic hydrocarbons by reacting sodium addition compounds with carbon dioxide. Such acid may be made, for example, by dissolving naphthalene in a suitable ether solvent, e. g., dimethyl ether, reacting the naphthalene solution with sodium to produce a disodium naphthalene addition compound and reacting this addition compound with carbon dioxide. These dicarboxylic acids are characterized by the fact that they contain two carbon atoms, to each of which is attached a hydrogen atom and a carboxyl group. They occur in two isomeric modifications, namely the dihydronaphthalene-1,4-dicarboxylic acid and the dihydronaphthalene-1,2-dicarboxylic acid. In my copending application Serial No. 743,843, I have disclosed and claimed the production of various esters of the dihydronaphthalene dicarboxylic acids. These esters may be secured by reacting the acids with alcohols, preferably in the presence of an esterification catalyst, for example sulfuric acid. The esters also may be prepared by reacting the sodium salts of the acids with halogenated hydrocarbons; for example, the ethyl ester may be made by reacting the sodium salt with ethyl chloride. These esters are useful for a variety of purposes, but they are somewhat unstable, tending to become slightly discolored after standing for extended periods of time. For many uses, such discoloration is not objectionable and does not impair the usefulness of the esters. However, for some uses, such discoloration is objectionable.

An object of the present invention is to prepare new and useful hydrogenated derivatives of dihydronaphthalene dicarboxylic esters and esters of other dicarboxyl derivatives of partially hydrogenated aromatic polycyclic hydrocarbons. Other objects will be apparent from the following description.

The above objects may be obtained by subjecting esters of dihydronaphthalene dicarboxylic acid to hydrogen pressure in the presence of a hydrogenation catalyst, preferably at elevated temperatures. By way of illustration, specific methods of practicing my invention are given in the following examples:

Example 1

Naphthalene was dissolved in dimethyl ether and the solution was maintained at a temperature of about $-30°$ C. and reacted with metallic sodium until no more sodium reacted. The resulting green solution of sodium-naphthalene addition compound then was reacted with carbon dioxide at $-30°$ C. until saturation was complete. On evaporation of the solvent, the crude sodium salts of the isomeric dihydronaphthalene dicarboxylic acids were obtained. The methyl ester then was prepared by suspending the crude salt in pure methanol and gradually adding sulfuric acid, while cooling to keep the temperature below $45°$ C. The resulting ester was recovered from the reaction mixture by distillation.

The dimethyl ester thus obtained was hydrogenated by subjecting it to a hydrogen pressure of 1000–1500 pounds per square inch in the presence of an activated nickel catalyst at a temperature of 150–180° C. The resulting hydrogenated product was a substantially colorless oily liquid having a boiling range of 130°–195° C. at approximately 2 mm. pressure, a specific gravity of 1.16, a refractive index of 1.5196 and a molecular weight of about 248. It was soluble in all proportions in methanol, ethanol, benzene, trichlorethane and cyclohexane.

During the hydrogenation, it was found that approximately one mole of hydrogen was absorbed per mole of ester used. It was also found that whereas one mole of the original ester will react with bromine to form an addition compound, the hydrogenated ester is substantially unreactive toward bromine at 0° C. in the dark.

Example 2

A dilauryl ester of dihydronaphthalene dicarboxylic acid was hydrogenated under the conditions of Example 1, except that about one-third part by volume of cyclohexane was added as a solvent. The product obtained was a colorless oil which had such a low vapor pressure that it could not be distilled, even in vacuo, below decomposition temperatures. It was soluble in absolute alcohol and somewhat soluble in cyclohexane. Its refractive index was 1.488. It did not react with bromine in the dark at 0° C.

While, by way of illustrating my invention, I have indicated above specific temperature and pressure conditions for hydrogenating the dihydronaphthalene dicarboxylic acid esters, other conditions obvious to those skilled in hydrogenating unsaturated organic compounds may be utilized without departing from the scope of my invention. I prefer to use relatively high hydrogen pressure, namely, at least 1000 pounds per square inch, and to operate at elevated temperatures, e. g. 100 to 200° C., since at lower pressures and temperatures the hydrogenation reaction goes more slowly. Various known hydrogenation catalysts are suitable for practicing my invention. For example, nickel catalysts, such as finely divided metallic nickel, nickel oxide, platinum black, copper or other known hydrogenation catalysts may be employed.

The products obtained by my invention are substantially colorless substances which usually are oily liquids at room temperature. They are, in general, soluble in a variety of organic solvents. They appear to occur in two isomeric forms. The chemical constitution of these products appears to correspond to the following type formulae:

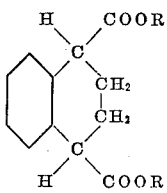

Tetrahydronaphthalene-1,4-dicarboxylic acid ester or

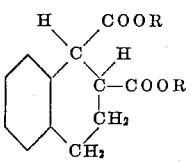

Tetrahydronaphthalene-1,2-dicarboxylic acid ester

My invention is not restricted to the hydrogenation of the esters derived from naphthalene, since esters of dicarboxyl derivatives obtained by the methods described herein from other polycyclic aromatic hydrocarbons may likewise be hydrogenated to secure useful products. Such esters include, for example, esters of the dicarboxyl derivatives of dihydrodiphenyl, dihydroanthracene, and dihydrophenanthrene. These esters may be prepared from the sodium addition compounds of the corresponding aromatic hydrocarbons by the methods set forth in copending applications mentioned above.

These hydrogenated esters are highly stable and in general do not discolor or show other signs of instability after standing for long periods of time.

I claim:

1. A process comprising hydrogenating an ester of a dicarboxy dihydro polycyclic aromatic hydrocarbon.

2. A process comprising hydrogenating an ester of dihydronaphthalene dicarboxylic acid.

3. A process comprising hydrogenating a dimethyl ester of dihydronaphthalene dicarboxylic acid.

4. A process comprising hydrogenating an ester of dihydronaphthalene dicarboxylic acid at a pressure of 1000 to 1500 pounds per square inch and at an elevated temperature in the presence of a catalyst.

5. A process comprising hydrogenating a dimethyl ester of dihydronaphthalene dicarboxylic acid at a pressure of 1000 to 1500 pounds per square inch and at a temperature of 100 to 200° C. in the presence of a nickel hydrogenating catalyst.

6. A process comprising hydrogenating a dilauryl ester of dihydronaphthalene dicarboxylic acid at a pressure of 1000 to 1500 pounds per square inch and at a temperature of 100 to 200° C. in the presence of a nickel hydrogenation catalyst.

7. An ester of tetrahydronaphthalene-1,4-dicarboxylic acid.

8. An ester of tetrahydronaphthalene-1,2-dicarboxylic acid.

9. The dimethyl ester of tetrahydronaphthalene-1,4-dicarboxylic acid.

10. The dilauryl ester of tetrahydronaphthalene-1,4-dicarboxylic acid.

11. A liquid mixture of the isomeric dimethyl esters of tetrahydronaphthalene-1,2-dicarboxylic acid and tetrahydronaphthalene-1,4-dicarboxylic acid, said mixture having a boiling range of about 130 to 195° C.

12. A liquid mixture of the isomeric dilauryl esters of tetrahydronaphthalene-1,2-dicarboxylic acid and tetrahydronaphthalene-1,4-dicarboxylic acid, said mixture having a refractive index of about 1.488.

NORMAN D. SCOTT.